US012619747B2

(12) United States Patent
Singh et al.

(10) Patent No.: US 12,619,747 B2
(45) Date of Patent: May 5, 2026

(54) SYSTEM AND METHOD FOR SECURE DATA CONSUMPTION BY MACHINE LEARNING MODELS

(71) Applicant: Bank of America Corporation, Charlotte, NC (US)

(72) Inventors: Shailendra Singh, Thane (IN); Krishna Mamadapur, Pune (IN); Jigesh Rajendra Safary, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 52 days.

(21) Appl. No.: 18/902,479

(22) Filed: Sep. 30, 2024

(65) Prior Publication Data

US 2026/0093826 A1    Apr. 2, 2026

(51) Int. Cl.
| | |
|---|---|
| *G06F 21/60* | (2013.01) |
| *G06F 9/54* | (2006.01) |
| *H04L 9/40* | (2022.01) |

(52) U.S. Cl.
CPC ............ *G06F 21/602* (2013.01); *G06F 9/544* (2013.01); *H04L 63/20* (2013.01)

(58) Field of Classification Search
CPC ........ G06F 21/6209; G06F 9/54; G06F 9/544; G06F 21/602; G06F 21/62; H04L 63/20
USPC ........................................................ 713/193
See application file for complete search history.

(56) References Cited

U.S. PATENT DOCUMENTS

| | | | |
|---|---|---|---|
| 8,553,038 B2 | 10/2013 | Platzer et al. | |
| 8,656,311 B1 | 2/2014 | Harper et al. | |
| 8,813,100 B1 | 8/2014 | Platzer | |
| 10,481,785 B2 | 11/2019 | Platzer et al. | |
| 10,481,826 B2 | 11/2019 | Vijayan et al. | |
| 10,750,311 B2 | 8/2020 | Haney | |
| 10,795,992 B2 | 10/2020 | Dykes | |
| 10,963,142 B2 | 3/2021 | Platzer et al. | |
| 11,184,188 B2 | 11/2021 | Ansari et al. | |
| 11,463,264 B2 | 10/2022 | Ngo | |
| 11,463,464 B2 | 10/2022 | Zadeh et al. | |
| 11,532,113 B2 | 12/2022 | Platzer et al. | |
| 11,588,658 B2 | 2/2023 | Ansari et al. | |
| 11,693,740 B2 | 7/2023 | Bangalore et al. | |
| 11,876,821 B1 | 1/2024 | Pratt et al. | |
| 11,907,168 B2 | 2/2024 | Prahlad et al. | |
| 11,909,752 B1 | 2/2024 | Kapoor et al. | |

(Continued)

OTHER PUBLICATIONS

NPL Search Terms (Year: 2025).*

(Continued)

*Primary Examiner* — Syed A Zaidi

(57) ABSTRACT

In response to receiving a request to generate an Application Programming Interface (API) program configured to extract data from an endpoint storage, the API program is generated based on the request by generating a software script configured to accept a data request to extract data from the endpoint storage, interface with the endpoint storage, and extract a requested piece of data from the endpoint storage. An NFT minting processor is used to generate an NFT for the API program, wherein the NFT stores one or more security rules defining usage of the API program. The NFT is then allocated to a requesting ML model allowing the ML model to use the API program to extract data from the endpoint storage.

20 Claims, 2 Drawing Sheets

(56) References Cited

U.S. PATENT DOCUMENTS

| | | | | |
|---|---|---|---|---|
| 11,954,322 | B2 | 4/2024 | Blumenberg | |
| 11,991,198 | B1 | 5/2024 | Kapoor et al. | |
| 2019/0297096 | A1 | 9/2019 | Ahmed et al. | |
| 2023/0188349 | A1* | 6/2023 | Moy | H04L 67/10 |
| | | | | 726/9 |
| 2023/0419327 | A1* | 12/2023 | Wu | G06Q 20/4016 |
| 2024/0070306 | A1* | 2/2024 | Jurat | G06F 21/6218 |
| 2024/0177145 | A1* | 5/2024 | Miele | G06Q 30/01 |
| 2024/0220966 | A1* | 7/2024 | Alva | H04L 9/3239 |
| 2024/0380596 | A1* | 11/2024 | Manelius | H04L 9/3213 |
| 2025/0014049 | A1* | 1/2025 | Shah | G06V 20/188 |
| 2025/0021534 | A1* | 1/2025 | Schlicher | G06F 16/219 |
| 2025/0022052 | A1* | 1/2025 | Schlicher | H04L 9/50 |
| 2025/0209141 | A1* | 6/2025 | Lehmann | G06N 3/044 |
| 2025/0363533 | A1* | 11/2025 | DeWeese | G06Q 30/04 |

OTHER PUBLICATIONS

Batra, Piyush, Gagan Raj Singh, and Ritik Gandhi. "Nft market-place." arXiv preprint arXiv:2304.10632 (2023) (Year: 2023).*

* cited by examiner

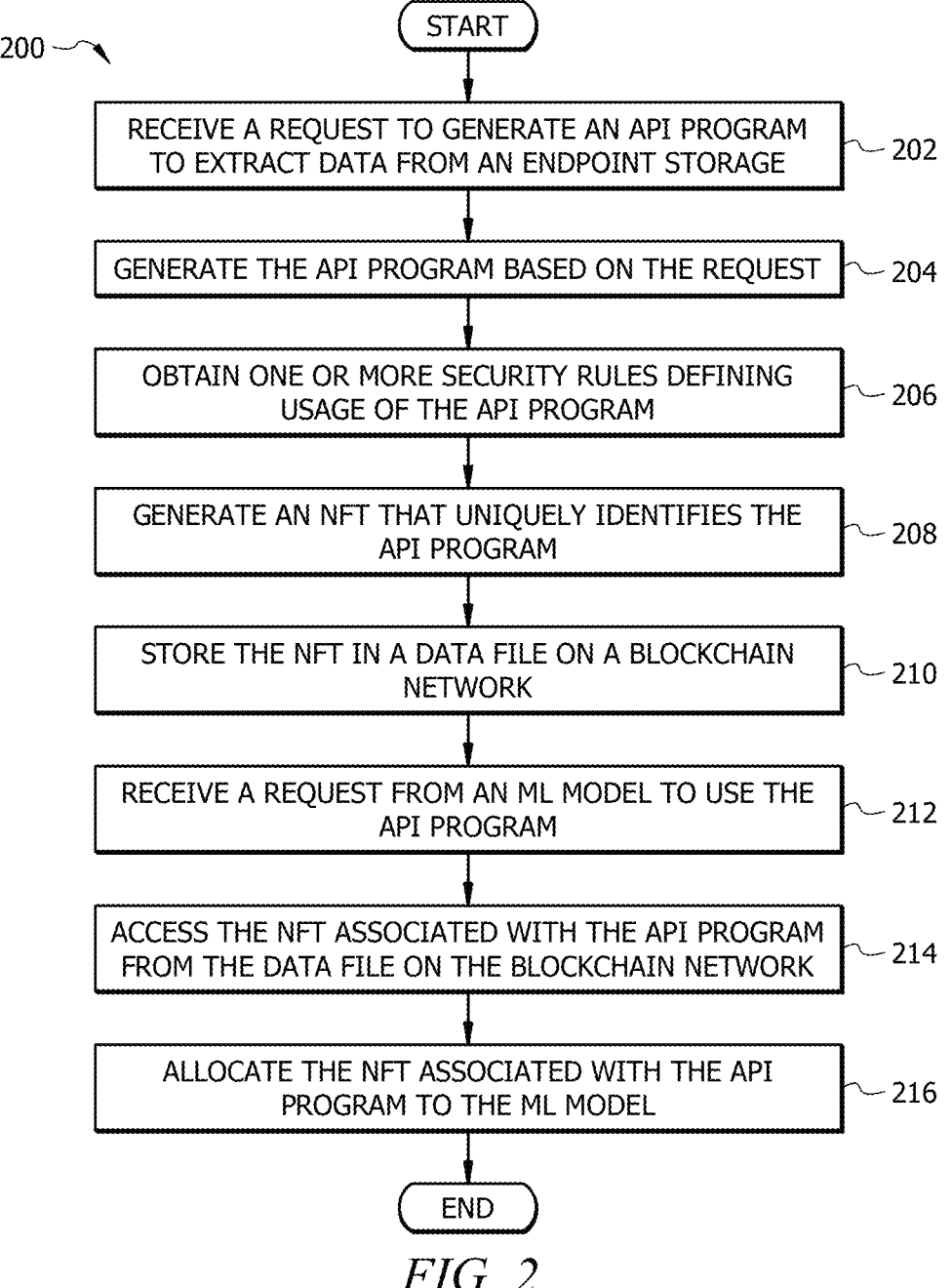

200

START

RECEIVE A REQUEST TO GENERATE AN API PROGRAM TO EXTRACT DATA FROM AN ENDPOINT STORAGE — 202

GENERATE THE API PROGRAM BASED ON THE REQUEST — 204

OBTAIN ONE OR MORE SECURITY RULES DEFINING USAGE OF THE API PROGRAM — 206

GENERATE AN NFT THAT UNIQUELY IDENTIFIES THE API PROGRAM — 208

STORE THE NFT IN A DATA FILE ON A BLOCKCHAIN NETWORK — 210

RECEIVE A REQUEST FROM AN ML MODEL TO USE THE API PROGRAM — 212

ACCESS THE NFT ASSOCIATED WITH THE API PROGRAM FROM THE DATA FILE ON THE BLOCKCHAIN NETWORK — 214

ALLOCATE THE NFT ASSOCIATED WITH THE API PROGRAM TO THE ML MODEL — 216

END

*FIG. 2*

SYSTEM AND METHOD FOR SECURE DATA CONSUMPTION BY MACHINE LEARNING MODELS

TECHNICAL FIELD

The present disclosure relates generally to network communication, and more specifically to a system and method for secure data consumption by machine learning models.

BACKGROUND

Presently there is no control over how an API program is used by a consumer (e.g., an AI model) of the API program. For example, there is no control over what and how much data is extracted from an endpoint node using the API program. In some cases, an endpoint node may store sensitive data (e.g., Personal Identifiable Information (PII) or other sensitive information). An AI/ML model may intentionally or unintentionally access/extract such sensitive data from the endpoint node. Presently, there is no control over and/or tracking relating to who accessed the sensitive data, what sensitive data was accessed, and/or how much sensitive data was accessed and/or extracted from an endpoint node. This may lead to unintentional and unauthorized disclosure of sensitive data. Further, since there is no tracking relating to access of sensitive data, there is no accountability associated with exposure of sensitive data.

SUMMARY

The system and method implemented by the system as disclosed in the present disclosure provide technical solutions to the technical problems discussed above by providing secure data access and extraction from an endpoint node.

For example, the disclosed system and methods provide the practical application of monitoring and controlling data access and extraction from an endpoint node. As described according to embodiments of the present disclosure the disclosed techniques leverage non-fungible token (NFT) technology and smart contract technology associated with blockchain networks to implement monitoring, tracking and controlling of data access and extraction from endpoint nodes.

For example, in response to receiving a request to generate an API program configured to extract data from an endpoint node/storage, an API manager generates the API program based on the request, wherein generating the API program includes generating a software script that is configured to accept a data request to extract data from the endpoint node, interface with the endpoint node, and extract a requested piece of data from the endpoint node. The API manager generates an NFT using an NFT minting server/processor, wherein the NFT uniquely identifies the API program and stores one or more security rules that define usage of the API program relating to accessing and extracting data from the endpoint node. Additionally, a smart contract is generated that implements the one or more security rules. The NFT associated with the API program along with the one or more security rules and the smart contract is stored in a data file on the blockchain network. In response to receiving a request from an AI/ML model to use the API program for accessing and/or extracting data from the endpoint node, the API manager accesses the NFT associated with the API program from the data file on the blockchain network and allocates the NFT to the AI/ML model allowing the AI/ML model to use the API program to access and/or extract data from the endpoint node. When a data access or data extraction using the API program is detected, the smart contract is run to determine whether the data access/extraction satisfies all security rules associated with the API program. In response to detecting a violation of one or more security rules, the API manager may withdraw allocation of the NFT to stop any further usage of the API program. By monitoring and controlling data access to an endpoint node using NFTs and smart contracts, the disclosed system and method avoid intentional or unintentional exposure of sensitive data stored at an endpoint node. For example, by monitoring a data access of the endpoint node and checking that the data access satisfies one or more data security rules of data access specified for data accesses from the endpoint node, the disclosed system and method reduces or completely avoids exfiltration, theft, or exposure of sensitive data. Since NFTs cannot be modified easily, this greatly reduces the possibility of bad actors tampering with the NFT. Further, by recording information relating to data interactions including data accesses to the endpoint node using the API program associated with the NFT in a blockchain in a verifiable and immutable manner, the system and method disclosed herein avoid tampering history of the data accesses by a malicious actor/entity. This raises the data security associated with data accesses to the endpoint node and raises general data security of the network. Thus, by improving data security of data accesses from endpoint nodes, the disclosed system and method generally improve the technology associated with data security of data interactions in a computing infrastructure.

The disclosed system and method provide the additional practical application of improving processing efficiency of processors and computers within a data network where data is extracted from one or more endpoint nodes. In conventional systems, when a data breach of an endpoint node is detected as a result of unintended and/or unauthorized extraction of data from the endpoint node, intrusion detection software is run at the affected endpoint node to determine the extent of the data breach and what data was stolen. Running the intrusion software at the endpoint node consumes considerable processing resources that could otherwise be used to process data queries from requesting nodes. In some cases, the endpoint node may need to be taken offline to investigate the nature of the data breach, how the data breach has affected the integrity of the endpoint node, and whether the data breach has left the endpoint node vulnerable to future attacks. By avoiding unintentional and/or unauthorized exposure of sensitive data, the disclosed system and method save computing resources that may otherwise be expended to track down and determine what data was exposed, how much data was exposed and who was responsible for the exposure of the data. Saving computing resources improves processing efficiency of processors and computers in a network. Additionally, by improving processing efficiency of computers and processors, the disclosed system and method improves computing technology.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates a flowchart of an example method for monitoring data access of an endpoint node, in accordance with one or more embodiments of the present disclosure.

DETAILED DESCRIPTION

Figure 1:
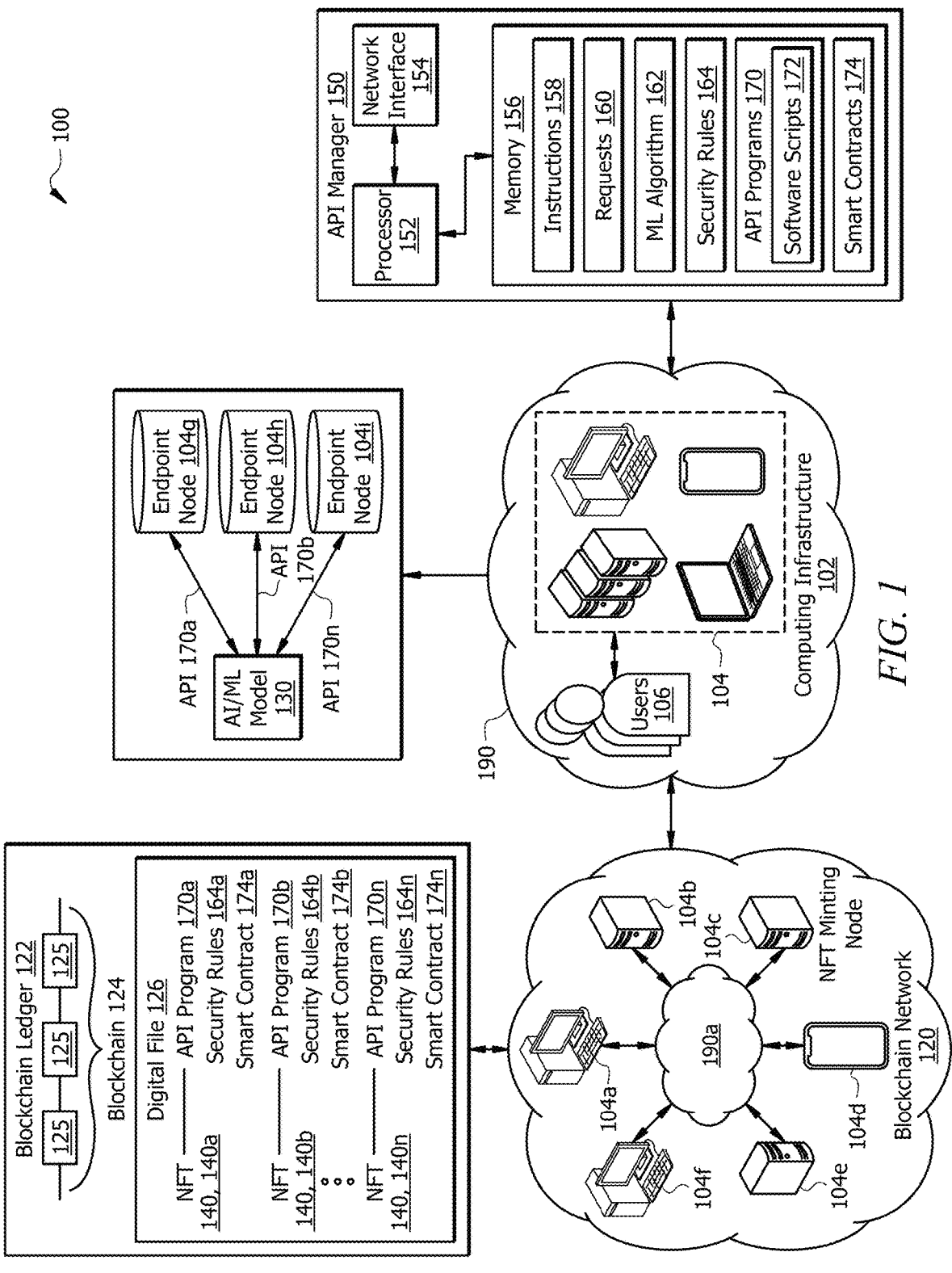
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 including a plurality of computing nodes 104 connected to a network 190. Computing infrastructure 102 may include a plurality of hardware and software components. The hardware components may include, but are not limited to, computing nodes 104 such as desktop computers, smartphones, tablet computers, laptop computers, servers and data centers, virtual reality (VR) headsets, augmented reality (AR) glasses and other hardware devices such as printers, routers, hubs, switches, and memory devices, that are all connected to the network 190. Software components may include software applications that are run by one or more of the computing nodes 104 including, but not limited to, operating systems, user interface applications, third party software, database management software, service management software, mainframe software, metaverse software, AI tools (e.g., AI/ML model 130) and other customized software programs (e.g., API manager 150) implementing particular functionalities. For example, software code relating to one or more software applications may be stored in a memory device and one or more processors (e.g., belonging to one or more computing nodes 104) may execute the software code to implement respective functionalities. An example software application run by one or more computing nodes 104 of the computing infrastructure 102 may include the API manager 150. In one embodiment, at least a portion of the computing infrastructure 102 may be representative of an Information Technology (IT) infrastructure of an organization.

One or more of the computing nodes 104 may be operated by a user 106. In this context, a computing node 104 operated by a user 106 may be referred to as a user device. For example, a computing node 104 may provide a user interface that may be used by a user 106 to operate the computing node 104 and perform data interactions within the computing infrastructure 102. The term "computing node 104" may be replaced by "user device" in this disclosure when the computing node 104 is operated by a user 106.

One or more computing nodes 104 of the computing infrastructure 102 may be representative of a computing system hosting software applications that may be installed and run locally or may be used to access software applications running on a server. The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality as described below. In certain embodiments, one or more of the computing nodes 104 may run a thin client software application where the processing is directed by the thin client but largely performed by a central entity such as a server (not shown).

Network 190, in general, may be a wide area network (WAN), a personal area network (PAN), a cellular network, or any other technology that allows devices to communicate electronically with other devices. In one or more embodiments, network 190 may be the Internet.

At least a portion of the computing infrastructure 102 may include a blockchain network 120. For example, a portion of the computing nodes 104 may form the blockchain network 120. As shown in FIG. 1, example blockchain network 120 includes computing nodes 104a, 104b, 104c, 104d, 104e, and 104f connected to each other via a portion of the network 190 (shown as 190a). One or more of the computing nodes 104a-f of the blockchain network 120 may be a Non-Fungible Token (NFT) minting node that is configured to generate NFTs 140. For example, as shown in FIG. 1, computing node 104c is an NFT minting node. The blockchain network 120 implements distributed computing which generally refers to a method of making multiple computers (e.g., computing nodes 104a-104f) work together to solve a common problem. This makes a computer network (e.g., blockchain network 120) appear as a powerful single computer that provides large-scale resources to deal with complex challenges. For example, distributed computing can encrypt large volumes of data, solve complex physics and chemical equations with many variables, and render high-quality, three-dimensional video animation. Distributed computing often uses specialized software applications that are configured to run on several computing nodes 104 instead of on just one computer, such that different computers perform different tasks and communicate to develop the final solution. High-performing distributed computing is often used in engineering research, financial services, energy sector and the like to run complex processes.

Blockchain network 120 may implement a blockchain 124 across a plurality of the computing nodes 104 (e.g., computing nodes 104a-104f). A blockchain (e.g., blockchain 124) generally is an open, decentralized and distributed digital ledger (e.g., blockchain ledger 122) consisting of records called blocks that are used to record data interactions across many computing nodes (e.g., computing nodes 104). Each computing node 104 of a blockchain network (e.g., blockchain network 120) may maintain a copy of the blockchain ledger (e.g., blockchain ledger 122). Logically, a blockchain is a chain of blocks which contains specific information. As shown in FIG. 1, blockchain 124 includes a chain of blocks 125. Once recorded, the data in any given block 125 cannot be altered retroactively without alteration of all subsequent blocks 125, which requires consensus of the network majority. Each computing node 104 within the blockchain network 120 maintains, approves, and updates new entries. The system is controlled not only by separate individuals, but by everyone within the blockchain network 120. Each member ensures that all records and procedures are in order, which results in data validity and security. Thus, the distributed ledger 122 can record data interactions between two parties (e.g., users 106) efficiently and in a verifiable and permanent way. By design, a blockchain 124 is resistant to modification of the data. In one embodiment, as discussed below in more detail, the blockchain network 120 may store a digital file 126 (e.g., in the blockchain ledger 122) that stores a plurality of NFTs 140 (shown as NFTs 140a-140n), wherein each NFT 140 is associated with a particular API program 170 and uniquely identifies the particular API program 170. As shown, NFTs 140a, 140b, and 140n are associated with and uniquely identify API programs 170a, 170b and 170n respectively. Each NFT 140 may further store one or more security rules 164 associated with the respective API program 170 and/or a smart contract 174 that implements the one or more security rules 164. As shown NFT 140a stores security rules 164a and smart contract 174a, NFT 140b stores security rules 164b and smart contract 174b, and NFT 140n stores security rules 164n and smart contract 174n. Security rules 164 and smart contracts 174 are described in more detail below.

Any new interaction or activity within the blockchain network may trigger the building of a new block of the blockchain. An interaction may include a computing node 104 of the blockchain network transmitting or receiving data from another computing node 104 of the blockchain network or from a computing node that is not part of the blockchain network. In the context of the present disclosure, an example interaction may include an AI/ML model 130 accessing data from an endpoint node 104g-I. Another example interaction may include generation of an NFT 140 by an NFT minting node 104c. Before a new block 125 is added to the blockchain, it needs to be verified by a majority of the computing nodes in the blockchain network 120.

Each block 125 of the blockchain includes a hash of the block 125, a hash of the previous block 125, data that records one or more data interactions or activities associated with the block 125, and a timestamp of the one or more interactions or activities recorded by the block 125. The data stored in each block 125 depends on the type of blockchain 124. For example, the data included in a block 125 may include information relating to the data interaction recorded by the block 125 including transmitting/receiving data, details of the data files, a copy of data received or generated as part of the interaction, identities of the sending and receiving nodes involved in the interaction etc. A hash of a block 125 is like a fingerprint that uniquely identifies the block 125 (and the interaction or activity recorded by the block 125) within the blockchain 124. Each hash of a block 125 is generated based on a cryptographic hash algorithm.

Often an AI/ML model 130 may need to access data from one or more data sources to perform an assigned task. These data sources are often referred to as "endpoint nodes" or just "endpoints" and often include databases, data centers, data servers etc. For example, when a user 106 provides the AI/ML model 130 a prompt stating "what are the cheapest countries to fly to in the month of December", the AI/ML model may need to access data relating to airline fares from several databases operated and/or owned by respective airlines. The AI/ML model 130 may analyze the data extracted from these databases to generate a response to the user prompt. For example, as shown in FIG. 1, the example AI/ML model 130 may have access to data stores in several endpoint nodes 104g-n. Typically, an AI/ML model 130 uses an Application Programming Interface (API) program 170 to interface with an endpoint node 104g-n and extracted data form the endpoint node 104g-n. In the context of the present disclosure the term "API program" refers to a software program that enables two software components (e.g., software applications) to communicate with each other using a set of definitions and protocols. For example, as shown in FIG. 1, the AI/ML model 130 uses API programs 170a-n to interface with respective endpoint nodes 104g-n. It may be noted that a single API program 170 may be configured to provide access to a plurality of endpoint nodes 104g-n. It may be noted that the AI/ML model 130 may be implemented (e.g., run) by one or more computing nodes 104 of the computing infrastructure 102. Further, each endpoint node 104g-n may also be a computing node 104 of the computing infrastructure 102.

In conventional systems, there is no control over how an API program 170 is used by a consumer (e.g., AI model) of the API program 170. For example, there is no control over what and how much data is extracted from an endpoint node 104g-n using an API program 170. In some cases, an endpoint node 104g-n may store sensitive data (e.g., Personal Identifiable Information (PII) or other sensitive information). An AI/ML model 130 may intentionally or unintentionally access/extract such sensitive data from an endpoint node. In conventional systems, there is no control over and/or tracking relating who accessed the sensitive data, what sensitive data was accessed, and/or how much sensitive data was accessed and/or extracted from an endpoint node. This may lead to unintentional and unauthorized disclosure of sensitive data. Further, since there is no tracking relating to access of sensitive data, there is no accountability associated with exposure of sensitive data.

Embodiments of the present disclosure employ techniques to monitor and control data access and extraction from an endpoint node 104g-n. As described according to embodiments of the present disclosure the disclosed techniques leverage NFT technology and smart contract technology associated with blockchain networks (e.g., blockchain network 120) to implement monitoring, tracking and controlling of data access and extraction from endpoint nodes 104g-n.

At least a portion of the computing infrastructure 102 (e.g., one or more computing nodes 104) may implement an API manager 150 which may be configured to implement techniques for monitoring and controlling data access and data extraction by an API program 170 from an endpoint node 104g-n. The API manager 150 includes a processor 152, a memory 156, and a network interface 154. The API manager 150 may be configured as shown in FIG. 1 or in any other suitable configuration.

The processor 152 includes one or more processors operably coupled to the memory 156. The processor 152 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions 158 to implement the API manager 150. In this way, processor 152 may be a special-purpose computer designed to implement the functions disclosed herein. In one or more embodiments, the API manager 150 is implemented using logic units, FPGAs, ASICs, DSPs, or any other suitable hardware. The API manager 150 is configured to operate as described with reference to FIG. 2. For example, the processor 152 may be configured to perform at least a portion of method 200 as described with reference to FIG. 2.

The memory 156 includes a non-transitory computer-readable medium such as one or more disks, tape drives, or solid-state drives, and may be used as an over-flow data storage device, to store programs when such programs are selected for execution, and to store instructions and data that are read during program execution. The memory 156 may be volatile or non-volatile and may include a read-only memory (ROM), random-access memory (RAM), ternary content-addressable memory (TCAM), dynamic random-access memory (DRAM), and static random-access memory (SRAM).

The memory 156 is operable to store the instructions 158, requests 160, machine learning (ML) algorithms 162, security rules 164, API programs 170 including software scripts 172 that implement the API programs 170, smart contracts 174 and any other data needed to performed operations of the API manager 150 as described in embodiments of the present disclosure. The instructions 158 may include any suitable set of instructions, logic, rules, or code operable to execute the API manager 150.

The network interface 154 is configured to enable wired and/or wireless communications. The network interface 154 is configured to communicate data between the API manager 150 and other devices, systems, or domains (e.g., computing nodes 104 including computing nodes 104a-f of the block-chain network 120 such as NFT minting node 104c of the blockchain network 120 and one or more computing nodes 104a-f that store the digital file 126). For example, the network interface 154 may include a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

It may be noted that each of the computing nodes 104 may be implemented like the API manager 150 shown in FIG. 1. For example, each of the computing nodes 104 may have a respective processor and a memory that stores data and instructions to perform a respective functionality of the computing node 104.

The API manager 150 may be configured to generate an API program 170 that is in turn configured to access data and further extract (e.g., download) data from one or more endpoint nodes 104g-n. In one embodiment, the API manager 150 may be configured to employ an ML algorithm 162 to generate an API program 170. In one embodiment, the API manager 150 may receive a request 160 to generate an API program 170 that can interface with a particular endpoint node 104g and provide access to data stored at the endpoint node 104g. The request 160 may include an identity of the endpoint node 104g. For example, the API manager 150 may render an API prompt interface on the user's user device (e.g., a computing node 104), wherein the API prompt interface may be associated with an ML model that runs the ML algorithm 162. The API prompt interface may allow a user 106 (e.g., an API developer) to initiate a request 160 for generating an API program 170. For example, the API prompt interface may allow the user 106 to enter text prompts, audio prompts, video prompts, or a combination thereof as part of the request 160. For example, the user 106 may enter a text prompt stating "generate an API program to extract data from endpoint node-XYZ", wherein the "XYZ" may be a unique identifier (e.g., a network address) associated with the endpoint node 104g.

The ML algorithm 162 may be configured (e.g., trained) to generate an API program 170 based on a set of requirements input to the ML algorithm, wherein the set of requirements may include an identification of one or more endpoint nodes 104g-n that the API program 170, once generated, is to provide access to. In one embodiment, the ML algorithm 162 parses the request prompt that is provided as part of the request 160, and determines the particular endpoint node 104g (e.g., endpoint node XYZ). The ML algorithm 162 then automatically generates an API program 170a that is configured to provide a consumer (e.g., AI/ML model 130) access to data stored on the endpoint node 104g specified in the request 160. Generating the API program 170a may include automatically generating a software script 172 that implements the API program 170a, wherein the API program 170a may be used for its intended functionality by running the software script 172, wherein the functionality includes accepting a data request to access/extract (e.g., download) data from the endpoint node 104g, interface with the endpoint node 104g, and access/extract a requested piece of data from the endpoint node 104g.

Once the API program 170a has been generated, the API manager 150 may be configured to generate a Non-Fungible Token (NFT) 140a associated with the API program 170a, wherein the NFT 140 uniquely identifies the API program 170a. As described in more detail below, the API manager 150 may use the NFT minting node 104c to generate NFTs 140 (e.g., NFT 140a) associated with respective API programs 170.

An NFT 140 is a blockchain based digital certificate that uniquely identifies a digital asset (e.g., an API program 170) and thus acts as verifiable proof of ownership of the digital asset. An NFT 140 may be generated for a particular digital asset e.g., an API program 170) and includes information relating to the digital asset, and further includes a unique digital signature that cannot be changed as NFTs 140 are stored in a distributed network such as a blockchain 124. Using a native digital signature scheme on the NFT block-chain network 120, it is easy to verify the authenticity of each NFT 140, its identity, its unique attributes, and its owner. Since NFTs 140 cannot be modified easily, this greatly reduces the possibility of bad actors tampering with the NFT 140. As described in more detail below, methods implemented by the API manager 150 leverage NFT technology to monitor and control data access of an endpoint node 104g using a respective API program 170a. For example, an NFT 140a associated with an API program 170a is used to monitor and control data access to the endpoint node 104g using the API program 170a. Further, by recording information relating to data interactions including data accesses to the endpoint node 104g using the API program 170a associated with the NFT 140a in a verifiable and immutable manner, the system and method disclosed herein avoid tampering history of the data accesses by a malicious entity.

An NFT 140 may be generated through a process called minting. Minting is a process that involves signing a block-chain transaction in the blockchain network 120 that outlines the fundamental token details, which is then broadcasted to the blockchain 124 to trigger a smart contract function which creates the token and assigns it to its owner (e.g., user 106 that generated the API program 170a associated to the NFT 140a or an entity associated with the user 106). This minting process may be performed by the NFT minting node 104c which may be a minting server of the blockchain network 120. An NFT 140a generated by the blockchain network 120 (e.g., by the NFT minting node 104c) generally includes a unique token ID of the NFT 140a and other information (e.g., security rules 164a and/or smart contract 174) related to the API program 170a identified by the NFT 140a, as described in more detail below.

In one or more embodiments, once the API program 170a has been generated, the API manager 150 may be configured to request the NFT minting node 104c to generate a unique NFT 140a associated with the API program 170a. Generating the NFT 140a by the NFT minting node 104c may include generating the NFT 140a identified by a unique token ID and associating the unique token ID of the NFT 140 to the API program 170a. In one embodiment, the NFT 140a may store a copy of the API program 170a (e.g., a copy of the software script 172) or a link to the API program 170a stored in the blockchain network 120 (e.g., stored on a computing node 104 of the blockchain network 120).

In one or more embodiments, the API manager 150 may have access to a set of security rules 164 that define usage of an API program 170 in relation to accessing and extracting (e.g., downloading) data from one or more endpoint nodes 104g-n. For example, the set of security rules 164 may include rules of data access that generally apply to all endpoint nodes 104g-n defining overall data security that is to be implemented in relation to access of data from endpoint nodes 104g-n. Additionally, or alternatively, the set of security rules 164 may include one or more security rules 164 that specifically apply to data access from a particular endpoint nodes (e.g., endpoint node 104g). In an additional or alternative embodiment, one or more security rules 164 may be received as part of the request 160 to generate the API program 170a, wherein the one or more security rules 164 received as part of the request 160 specifically define rules related to usage of the API program 170a, one generated, for accessing and extracting data from the endpoint node 104g.

In one embodiment, the security rules 164 may include one or more of a type of data that can be extracted from the endpoint computing node 104g by the API program 170a, a time period of usage of data extracted from the endpoint computing node 104g, a number of times data can be extracted from the endpoint computing node 104g, an encryption type of data extracted from the endpoint computing node 104g, an endpoint URL where the endpoint computing node 104g is to be accessed, an extraction protocol to be used to extract data from the endpoint computing node 104g, or identities on one or more AI/ML models 130 that are authorized to use the API program 170a.

In one or more embodiments, the API manager 150 may be configured to obtain one or more security rules 164 defining usage of the generated API program 170 (including security rules 164 that generally apply to a plurality of endpoint nodes 104g-n, security rules 164 that specifically apply to the endpoint node 104g, and security rules 164 received as part of the request 160). The API manager 150 may be configured to store the obtained security rules 164 as part of the NFT 140a minted (e.g., by the NFT minting node 104c) for the API program 170a.

In one or more embodiments, once generated, the API manager 150 may be configured to store the NFT 140a associated with the API program 170a in the digital file 126. In one embodiment, the digital file 126 is a digital wallet configured to store a plurality of NFTs 140. Once the NFT 140a is stored in the digital file 126, a consumer (e.g., AI/ML model 130) desiring to use the API program 170a may access the API program 170 by acquiring an allocation of the NFT 140a associated with the API program 170a. In one embodiment, the API manager 150 may be configured to temporarily allocate the NFT 140a to a requesting AI/ML model 130 that desires to access and/or extract (e.g., download) data from the endpoint node 104g using the API program 170a.

In one or more embodiments, the API manager 150 may be configured to generate a smart contract 174a based on the one or more security rules 164 associated with the API program 170a, wherein the smart contract 174a implements the one or more security rules 164a in relation to usage of the API program 170a in accessing and extracting (e.g., downloading) data from the respective endpoint node 104g. In one embodiment, the API manager 150 may be configured to use the ML algorithm 162 to generate the smart contract 174a, wherein the ML algorithm 162 may be trained to generate smart contracts 174 associated with respective API programs 170 based on one or more security rules 164 associated with the respective API programs 170. For example, the API manager 150 may input to the ML algorithm 162 the API program 170a and the one or more security rules 164 associated with the API program 170a. The API manager 150 may obtain the smart contract 174a as part of a result output by the ML algorithm 162. In one embodiment, the API manager 150 may store the smart contract 174a as part of the NFT 140a associated with the respective API program 170a.

In one or more embodiments, the API manager 150 may be configured to allocate access to an API program 170a stored in the digital file 126 to consumers (e.g., AI/ML model 130) that request access to the API program 170a. For example, the API manager 150 may receive a request 160 from the AI/ML model 130 to use the API program 170a for accessing and/or extracting data from the endpoint node 104g. In response to receiving the request 160 from the AI/ML model 130, the API manager 150 may be configured to access the NFT 140a associated with the requested API program 170a from the data file 126 and allocate the NFT 140a to the AI/ML model 130. Once the NFT 140a has been allocated to the AI/ML model 130, the AI/ML model 130 may access the API program 170a associated with the NFT 140a and use the API program 170a to access and/or extract data from the respective endpoint node 104g.

In one or more embodiments, the API manager 150 may be configured to control the usage of the API program 170a by the AI/ML model 130 using the smart contract 174a associated with the API program 170a. For example, in response to receiving the request 160 from the AI/ML model 130 for allocation of the API program 170a, the API manager 150 may access the NFT 140a associated with the requested API program 170a from the data file 126 and extract the smart contract 174a stored as part of the NFT 140a. The API manager 150 may transmit a copy of the smart contract 174a to the AI/ML model 130. This provides the AI/ML model 130 an opportunity to consider the one or more security rules 164a that are implemented by the smart contract 174a in relation to using the API program 170a to access/extract data from endpoint node 104g. The API program 170 may be configured to allocate the NFT 140a to the AI/ML model 130 only upon receiving an approval of the smart contract 174a. For example, after considering the one or more security rules 164a that are implemented by the smart contract 174a, the AI/ML model 130 may transmit an approval (e.g., by digitally signing the smart contract 174a) of the smart contract 174a to the API manager 150. The API program 170 may allocate the NFT 140a to the AI/ML model 130 in response to receiving the approval of the smart contract 174a.

In one embodiment, the API manager 150 may generate the smart contract 174a in response to receiving the request 160 for allocation of the API program 170a. For example, in response to receiving the request 160, the API manager 150 may access the NFT 140a associated with the requested API program 170a from the data file 126 and extract the one or more security rules 164a associated with the API program 170. The API manager 150 may generate the smart contract 174a as described above (e.g., by using the ML algorithm 162) and store the generated smart contract 174a in the digital file 126 as part of the NFT 140a. Once the smart contract 174 has been generated, the API manager 150 may start the process of seeking an approval of the smart contract 174a from the requesting AI/ML model 130 as described above.

In one or more embodiments, the API manager 150 may be configured to allow negotiation of one or more rules implemented by the smart contract 174a with the requesting AI/ML model 130. For example, in response to receiving a copy of the smart contract 174a (e.g., stored as part of the NFT 140a), the AI/ML model 130 may transmit a request to update a particular security rule 164a included in the smart contract 174a. The API manager 150 forward the request to update the particular security rule 164a to an API administrator (e.g., a user 106 of the computing infrastructure 102) for approval. Upon receiving approval of the requested update, the API manager 150 may update the particular security rule in the smart contract 174a to generate an updated smart contract 174a and store the updated smart contract 174a as part of the NFT 140a. In one embodiment, the API manager 150 may transmit the updated smart contract 174a to the AI/ML model 130 for approval, and, upon receiving an approval of the updated smart contract 174a, allocate the NFT 140a associated with the API program 170a to the AI/ML model 130.

In one or more embodiments, once the NFT 140a has been allocated to the AI/ML model 130a, the API manager 150 may employ the smart contract 174a to monitor any data accesses of the endpoint node 104g by the AI/ML model 130 using the API program 170a associated with the NFT 140a. In one embodiment, the AI/ML model 130 uses the API program 170a by accessing the respective NFT 140a from the digital file 126. For example, each time the AI/ML model 130 accesses the NFT 140a, the API manager 150 verifies whether the allocation of the NFT 140a to the AI/ML model 130 is still active and allows the AI/ML model 130 to access and use the API program 170 upon successfully validating the allocation. This allows the API manager 150 to detect each instance of usage of the API program 170a by the AI/ML model 130. For example, in response to detecting that the AI/ML model 130 has accessed the NFT 140a stored in the digital file 126 and has initiated a data interaction for accessing/extracting data from the endpoint node 104g using the API program 170a, the API manager 150 accesses the smart contract 174a (the approved smart contract 174a or updated smart contract 174a) from the NFT 140a and runs the smart contract 174a to monitor the data interaction and implement the one or more security rules of the smart contract 174a. For example, the smart contract 174a checks each data access and data extraction (e.g., data download) carried out by the AI/ML model 130 using the API program 170a and checks whether the data access or data extraction satisfies all security rules 164a defined for the API program 170a.

In one embodiment, the API program 170 may be configured to raise an alert and/or withdraw allocation of the NFT 140a (e.g., at least temporarily) in response to determining that a particular data access or data extraction has violated one or more security rules 164a. For example, a particular security rule 164a may specify that the AI/ML model 130 is not authorized to extract a particular piece of data from the endpoint node 104g. Based on monitoring a data access and/or data extraction conducted by the AI/ML model 130, the API manager 150 (e.g., using the smart contract 174a) may determine that the AI/ML model 130 used the API program 170a to extract the particular piece of data from the endpoint node 104g. In response to this determination, the API program 170 may withdraw the allocation of the NFT 140a to the AI/ML model 130 to stop further use of the API program 170a by the AI/ML model 130. In an additional or alternative embodiment, an alert message may be sent to an API support team for investigation of the security rule violation.

FIG. 2 illustrates a flowchart of an example method for monitoring data access of an endpoint node, in accordance with one or more embodiments of the present disclosure. Method 200 may be performed by the API manager 150 shown in FIG. 1. At operation 202, API manager 150 receives a request 160 to generate an API program 170 configured to extract data from an endpoint storage (e.g., endpoint node 104), wherein the request 160 at least comprises an identity of the endpoint storage.

As described above, the API manager 150 may be configured to generate an API program 170 that is in turn configured to access data and further extract (e.g., download) data from one or more endpoint nodes 104g-n. In one embodiment, the API manager 150 may be configured to employ an ML algorithm 162 to generate an API program 170. In one embodiment, the API manager 150 may receive a request 160 to generate an API program 170 that can interface with a particular endpoint node 104g and provide access to data stored at the endpoint node 104g. The request 160 may include an identity of the endpoint node 104g. For example, the API manager 150 may render an API prompt interface on the user's user device (e.g., a computing node 104), wherein the API prompt interface may be associated with an ML model that runs the ML algorithm 162. The API prompt interface may allow a user 106 (e.g., an API developer) to initiate a request 160 for generating an API program 170. For example, the API prompt interface may allow the user 106 to enter text prompts, audio prompts, video prompts, or a combination thereof as part of the request 160. For example, the user 106 may enter a text prompt stating "generate an API program to extract data from endpoint node-XYZ", wherein the "XYZ" may be a unique identifier (e.g., a network address) associated with the endpoint node 104g.

At operation 204, API manager 150 generates the API program 170 based on the request 160, wherein generating the API program 170 includes generating a software script 172 that is configured to accept a data request to extract data from the endpoint storage (e.g., endpoint node 104), interface with the endpoint storage, and extract a requested piece of data from the endpoint storage.

As described above, the ML algorithm 162 may be configured (e.g., trained) to generate an API program 170 based on a set of requirements input to the ML algorithm, wherein the set of requirements may include an identification of one or more endpoint nodes 104g-n that the API program 170, once generated, is to provide access to. In one embodiment, the ML algorithm 162 parses the request prompt that is provided as part of the request 160, and determines the particular endpoint node 104g (e.g., endpoint node XYZ). The ML algorithm 162 then automatically generates an API program 170a that is configured to provide a consumer (e.g., AI/ML model 130) access to data stored on the endpoint node 104g specified in the request 160. Generating the API program 170a may include automatically generating a software script 172 that implements the API program 170a, wherein the API program 170a may be used for its intended functionality by running the software script 172, wherein the functionality includes accepting a data request to access/extract (e.g., download) data from the endpoint node 104g, interface with the endpoint node 104g, and access/extract a requested piece of data from the endpoint node 104g.

At operation 206, API manager 150 obtains the one or more security rules 164 defining usage of the API program 170.

At operation 208, API manager 150 causes, one or more NFT processors (e.g., NFT minting node 104c) of the blockchain network 120, to generate an NFT 140 that uniquely identifies the API program 170, wherein the NFT 140 stores the one or more security rules 164 associated with the API program 170.

As described above, once the API program 170a has been generated, the API manager 150 may be configured to generate a Non-Fungible Token (NFT) 140a associated with the API program 170a, wherein the NFT 140 uniquely identifies the API program 170a. As described in more detail below, the API manager 150 may use the NFT minting node 104c to generate NFTs 140 (e.g., NFT 140a) associated with respective API programs 170.

In one or more embodiments, once the API program 170a has been generated, the API manager 150 may be configured to request the NFT minting node 104c to generate a unique NFT 140a associated with the API program 170a. Generating the NFT 140a by the NFT minting node 104c may include generating the NFT 140a identified by a unique token ID and associating the unique token ID of the NFT 140 to the API program 170a. In one embodiment, the NFT 140a may store a copy of the API program 170a (e.g., a copy of the software script 172) or a link to the API program 170a in the blockchain network 120 (e.g., stored on a computing node 104 of the blockchain network 120).

In one or more embodiments, the API manager 150 may have access to a set of security rules 164 that define usage of an API program 170 in relation to accessing and extracting (e.g., downloading) data from one or more endpoint nodes 104g-n. For example, the set of security rules 164 may include rules of data access that generally apply to all endpoint nodes 104g-n defining overall data security that is to be implemented in relation to access of data from endpoint nodes 104g-n. Additionally, or alternatively, the set of security rules 164 may include one or more security rules 164 that specifically apply to data access from a particular endpoint nodes (e.g., endpoint node 104g). In an additional or alternative embodiment, one or more security rules 164 may be received as part of the request 160 to generate the API program 170a, wherein the one or more security rules 164 received as part of the request 160 specifically define rules related to usage of the API program 170a, one generated, for accessing and extracting data from the endpoint node 104g.

In one embodiment, the security rules 164 may include one or more of a type of data that can be extracted from the endpoint computing node 104g by the API program 170a, a time period of usage of data extracted from the endpoint computing node 104g, a number of times data can be extracted from the endpoint computing node 104g, an encryption type of data extracted from the endpoint computing node 104g, an endpoint URL where the endpoint computing node 104g is to be accessed, an extraction protocol to be used to extract data from the endpoint computing node 104g, or identities on one or more AI/ML models 130 that are authorized to use the API program 170a.

In one or more embodiments, the API manager 150 may be configured to obtain one or more security rules 164 defining usage of the generated API program 170 (including security rules 164 that generally apply to a plurality of endpoint nodes 104g-n, security rules 164 that specifically apply to the endpoint node 104g, and security rules 164 received as part of the request 160). The API manager 150 may be configured to store the obtained security rules 164 as part of the NFT 140a minted (e.g., by the NFT minting node 104c) for the API program 170a.

At operation 210, API manager 150 stores the NFT 140 in a data file (e.g., digital file 126) on the blockchain network 120. As described above, once generated, the API manager 150 may be configured to store the NFT 140a associated with the API program 170a in the digital file 126. In one embodiment, the digital file 126 is a digital wallet configured to store a plurality of NFTs 140.

At operation 212, API manager 150 receives a request from a machine learning (ML) model (e.g., AI/ML model 130) to use the API program 170 for extracting data from the endpoint storage (e.g., endpoint node 104).

As described above, once the NFT 140a is stored in the digital file 126, a consumer (e.g., AI/ML model 130) desiring to use the API program 170a may access the API program 170 by acquiring an allocation of the NFT 140a associated with the API program 170a. In one embodiment, the API manager 150 may be configured to temporarily allocate the NFT 140a to a requesting AI/ML model 130 that desires to access and/or extract (e.g., download) data from the endpoint node 104g using the API program 170a. For example, the API manager 150 may receive a request 160 from the AI/ML model 130 to use the API program 170a for accessing and/or extracting data from the endpoint node 104g.

At operation 214, API manager 150 accesses the NFT 140 associated with the API program 170 from data file (e.g., digital file 126) on the blockchain network 120.

At operation 216, API manager 150 allocates the NFT 140 associated with the API program 170 to the ML model (e.g., AI/ML model 130) allowing the ML model to use the API program 170 to extract the requested data from the endpoint storage (e.g., endpoint node 104).

As described above, in response to receiving the request 160 from the AI/ML model 130, the API manager 150 may be configured to access the NFT 140a associated with the requested API program 170a from the data file 126 and allocate the NFT 140a to the AI/ML model 130. Once the NFT 140a has been allocated to the AI/ML model 130, the AI/ML model 130 may access the API program 170a associated with the NFT 140a and use the API program 170a to access and/or extract data from the respective endpoint node 104g.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:

a blockchain network comprising one or more Non-Fungible Token (NFT) minting processors configured to generate NFTs;

a memory configured to store one or more security rules defining usage of an Application Programming Interface (API) program configured to extract data from an endpoint storage; and a processor communicatively coupled to the blockchain network and the memory, the processor configured to:

receive a request to generate the API program configured to extract data from the endpoint storage, wherein the request at least comprises an identity of the endpoint storage;

generate the API program based on the request, wherein generating the API program comprises generating a software script that is configured to accept a data request to extract data from the endpoint storage, interface with the endpoint storage, and extract a requested piece of data from the endpoint storage;

obtain the one or more security rules defining usage of the API program;

cause the one or more NFT minting processors of the blockchain network to generate an NFT that uniquely identifies the API program, wherein the NFT stores the one or more security rules associated with the API program;

store the NFT in a data file on the blockchain network;

receive a request from a machine learning (ML) model to use the API program for extracting data from the endpoint storage; and access the NFT associated with the API program from data file on the blockchain network; and allocate the NFT associated with the API program to the ML model allowing the ML model to use the API program to extract the requested data from the endpoint storage.

2. The system of claim 1, wherein the processor is further configured to:

in response to receiving the request from the ML model to use the API program, extract, from the data file, the one or more security rules associated with the NFT of the API program;

generate a smart contract that implements usage of the API program according to the one or more security rules; and store the smart contract in the blockchain network.

3. The system of claim 2, wherein the processor is further configured to:

transmit the smart contract to the ML model;

receive an approval of the smart contract from the ML model; and in response to receiving the approval of the smart contract, allocate the NFT associated with the API program to the ML model.

4. The system of claim 2, wherein the processor is further configured to:

transmit the smart contract to the ML model;

receive a request to update a particular security rule included in the smart contract;

update the particular security rule to generate an updated smart contract;

transmit the updated smart contract to the ML model;

receive an approval of the updated smart contract from the ML model; and in response to receiving the approval of the updated smart contract, allocate the NFT associated with the API program to the ML model.

5. The system of claim 2, wherein the processor is further configured to:

detect that the ML model has accessed the API program and initiated a data interaction for extracting data from the endpoint storage using the API program;

in response to detecting that the ML model has accessed the API program, access the smart contract from the blockchain network; and run the smart contract to monitor the data interaction and implement the one or more security rules in the smart contract.

6. The system of claim 5, wherein:

the smart contract includes a particular security rule that specifies that the ML model is not authorized to extract a particular piece of data from the endpoint storage; and the processor is further configured to:

detect, based on monitoring the data interaction using the smart contract, that the API program is used to extract the particular piece of data from the endpoint storage; and in response to detecting that the API program is used to extract the particular piece of data from the endpoint storage, withdraw allocation of the NFT associated with the API program to the ML model to stop further use of the API program by the ML model.

7. The system of claim 1, wherein the one or more security rules define usage of the API program relating to one or more of a type of data that can be extracted from the endpoint storage, a time period of usage of data extracted from the endpoint storage, a number of times data can be extracted from the endpoint storage, an encryption type of data extracted from the endpoint storage, an endpoint URL where the endpoint storage is to be accessed, an extraction protocol to be used to extract data from the endpoint storage, or identities on one or more ML models that are authorized to use the API program.

8. A method comprising:

receive a request to generate an API program configured to extract data from an endpoint storage, wherein the request at least comprises an identity of the endpoint storage;

generate the API program based on the request, wherein generating the API program comprises generating a software script that is configured to accept a data request to extract data from the endpoint storage, interface with the endpoint storage, and extract a requested piece of data from the endpoint storage;

obtain one or more security rules defining usage of the API program;

cause one or more NFT minting processors of a blockchain network to generate an NFT that uniquely identifies the API program, wherein the NFT stores the one or more security rules associated with the API program;

store the NFT in a data file on the blockchain network;

receive a request from a machine learning (ML) model to use the API program for extracting data from the endpoint storage; and access the NFT associated with the API program from data file on the blockchain network; and allocate the NFT associated with the API program to the ML model allowing the ML model to use the API program to extract the requested data from the endpoint storage.

9. The method of claim 8, wherein the processor is further configured to:

in response to receiving the request from the ML model to use the API program, extract, from the data file, the one or more security rules associated with the NFT of the API program;

generate a smart contract that implements usage of the API program according to the one or more security rules; and store the smart contract in the blockchain network.

10. The method of claim 9, wherein the processor is further configured to:

transmit the smart contract to the ML model;

receive an approval of the smart contract from the ML model; and in response to receiving the approval of the smart contract, allocate the NFT associated with the API program to the ML model.

11. The method of claim 9, wherein the processor is further configured to:

transmit the smart contract to the ML model;

receive a request to update a particular security rule included in the smart contract;

update the particular security rule to generate an updated smart contract;

transmit the updated smart contract to the ML model;

receive an approval of the updated smart contract from the ML model; and in response to receiving the approval of the updated smart contract, allocate the NFT associated with the API program to the ML model.

12. The method of claim 9, wherein the processor is further configured to:

detect that the ML model has accessed the API program and initiated a data interaction for extracting data from the endpoint storage using the API program;

in response to detecting that the ML model has accessed the API program, access the smart contract from the blockchain network; and run the smart contract to monitor the data interaction and implement the one or more security rules in the smart contract.

13. The method of claim 12, wherein:

the smart contract includes a particular security rule that specifies that the ML model is not authorized to extract a particular piece of data from the endpoint storage; and the processor is further configured to:

detect, based on monitoring the data interaction using the smart contract, that the API program is used to extract the particular piece of data from the endpoint storage; and in response to detecting that the API program is used to extract the particular piece of data from the endpoint storage, withdraw allocation of the NFT associated with the API program to the ML model to stop further use of the API program by the ML model.

14. The method of claim 8, wherein the one or more security rules define usage of the API program relating to one or more of a type of data that can be extracted from the endpoint storage, a time period of usage of data extracted from the endpoint storage, a number of times data can be extracted from the endpoint storage, an encryption type of data extracted from the endpoint storage, an endpoint URL where the endpoint storage is to be accessed, an extraction protocol to be used to extract data from the endpoint storage, or identities on one or more ML models that are authorized to use the API program.

15. A non-transitory computer-readable medium storing instructions that when executed by a processor causes the processor to:

receive a request to generate an API program configured to extract data from an endpoint storage, wherein the request at least comprises an identity of the endpoint storage;

generate the API program based on the request, wherein generating the API program comprises generating a software script that is configured to accept a data request to extract data from the endpoint storage, interface with the endpoint storage, and extract a requested piece of data from the endpoint storage;

obtain one or more security rules defining usage of the API program;

cause one or more NFT minting processors of a blockchain network to generate an NFT that uniquely identifies the API program, wherein the NFT stores the one or more security rules associated with the API program;

store the NFT in a data file on the blockchain network;

receive a request from a machine learning (ML) model to use the API program for extracting data from the endpoint storage; and access the NFT associated with the API program from data file on the blockchain network; and allocate the NFT associated with the API program to the ML model allowing the ML model to use the API program to extract the requested data from the endpoint storage.

16. The non-transitory computer-readable medium of claim 15, wherein the processor is further configured to:

in response to receiving the request from the ML model to use the API program, extract, from the data file, the one or more security rules associated with the NFT of the API program;

generate a smart contract that implements usage of the API program according to the one or more security rules; and store the smart contract in the blockchain network.

17. The non-transitory computer-readable medium of claim 16, wherein the processor is further configured to:

transmit the smart contract to the ML model;

receive an approval of the smart contract from the ML model; and in response to receiving the approval of the smart contract, allocate the NFT associated with the API program to the ML model.

18. The non-transitory computer-readable medium of claim 16, wherein the processor is further configured to:

transmit the smart contract to the ML model;

receive a request to update a particular security rule included in the smart contract;

update the particular security rule to generate an updated smart contract;

transmit the updated smart contract to the ML model;

receive an approval of the updated smart contract from the ML model; and in response to receiving the approval of the updated smart contract, allocate the NFT associated with the API program to the ML model.

19. The non-transitory computer-readable medium of claim 16, wherein the processor is further configured to:

detect that the ML model has accessed the API program and initiated a data interaction for extracting data from the endpoint storage using the API program;

in response to detecting that the ML model has accessed the API program, access the smart contract from the blockchain network; and run the smart contract to monitor the data interaction and implement the one or more security rules in the smart contract.

20. The non-transitory computer-readable medium of claim 19, wherein:

the smart contract includes a particular security rule that specifies that the ML model is not authorized to extract a particular piece of data from the endpoint storage; and the processor is further configured to:

detect, based on monitoring the data interaction using the smart contract, that the API program is used to extract the particular piece of data from the endpoint storage; and in response to detecting that the API program is used to extract the particular piece of data from the endpoint storage, withdraw allocation of the NFT associated with the API program to the ML model to stop further use of the API program by the ML model.

* * * * *